(12) United States Patent
Nishikata et al.

(10) Patent No.: US 8,169,913 B2
(45) Date of Patent: May 1, 2012

(54) COMMUNICATION-PROCESSING METHOD ON NETWORK-CONNECTED EQUIPMENT AND RECEIVING APPARATUS

(75) Inventors: Natsuko Nishikata, Kanagawa (JP); Kazuyuki Ikeda, Tokyo (JP); Manabu Onishi, Tokyo (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 11/836,344

(22) Filed: Aug. 9, 2007

(65) Prior Publication Data
US 2008/0130518 A1 Jun. 5, 2008

(30) Foreign Application Priority Data
Sep. 5, 2006 (JP) ................. 2006-240874

(51) Int. Cl.
*H04J 1/16* (2006.01)
(52) U.S. Cl. ......... 370/236; 370/235; 370/241; 370/249
(58) Field of Classification Search ........... 370/229–258
See application file for complete search history.

(56) References Cited

U.S. PATENT DOCUMENTS

| | | | | |
|---|---|---|---|---|
| 5,600,797 | A * | 2/1997 | Marshall | 709/224 |
| 5,936,962 | A * | 8/1999 | Haddock et al. | 370/446 |
| 6,205,477 | B1 * | 3/2001 | Johnson et al. | 709/220 |
| 6,430,610 | B1 * | 8/2002 | Carter | 709/221 |
| 6,618,755 | B1 * | 9/2003 | Bonn | 709/223 |
| 2002/0133589 | A1 * | 9/2002 | Gubbi et al. | 709/225 |
| 2004/0078395 | A1 * | 4/2004 | Rinkevich et al. | 707/201 |
| 2004/0167840 | A1 * | 8/2004 | Tully et al. | 705/35 |
| 2004/0234234 | A1 * | 11/2004 | Loytana et al. | 386/46 |

FOREIGN PATENT DOCUMENTS

| | | |
|---|---|---|
| JP | 11-249900 | 9/1999 |
| JP | 2000-155730 | 6/2000 |
| JP | 2004-222042 | 8/2004 |
| JP | 2005-39781 | 2/2005 |
| JP | 2006-41761 | 2/2006 |

OTHER PUBLICATIONS

Wikipedia.org. Ethernet. Aug. 30 2005. <http://web.archive.org/web/20050830185706/http://en.wikipedia.org/wiki/Ethernet>.*
Teruyuki Miyakawa, "New Directions in Digital Broadcasting", The Journal of the Institute of Image Information and Television Engineers, The Institute of Image Information and Television Engineers, vol. 60, No. 5, May 1, 2006, pp. 694-696 and two cover pages.
Ko Sotozaki, "A Practice Lecture AV & DVD Seminar 19th Watching Television by Free Location", ASAHI Personal Computer, No. 392, Japan, Asahi Newspaper Co. Ltd., Nov. 15, 2005, pp. 80-83.

* cited by examiner

*Primary Examiner* — Hassan Kizou
*Assistant Examiner* — Ashil Farahmand
(74) *Attorney, Agent, or Firm* — Oblon, Spivak, McClelland, Maier & Neustadt, L.L.P.

(57) ABSTRACT

A communication-processing method performs communication processing on any network-connected equipment. The method includes the steps of sending an identification signal through a network to every apparatus that is connected in an identical network circuit to identify a local apparatus, and determining whether a reply signal including identification information in reply to the sent identification signal is received or not. The method also includes the steps of deciding that the local apparatus is connected to the identical network circuit if receiving the reply signal including the identification information to secure a communication-processing condition for the identified local apparatus, communicating with the identified local apparatus, and sending the communication-processing condition to the identified local apparatus.

9 Claims, 7 Drawing Sheets

COMMUNICATION-PROCESSING METHOD ON NETWORK-CONNECTED EQUIPMENT AND RECEIVING APPARATUS

CROSS-REFERENCES TO RELATED APPLICATIONS

The present invention contains subject matter related to Japanese Patent Application JP 2006-240874 filed in the Japanese Patent Office on Sep. 5, 2006, the entire contents of which being incorporated herein by reference.

BACKGROUND OF THE INVENTION

1. Field of the Invention

The present invention relates to a communication-processing method on network-connected equipment and a receiving apparatus. More particularly, it relates to a communication-processing method and the like that are available for an information-receiving-and-transmitting system under which a user can view image information and listen to audio information from an external video apparatus by using a television receiver installed at any places other than a place where the external video apparatus is installed or a television receiver installed at a place where the user has gone to.

2. Description of Related Art

Japanese Patent Application Publication No. 2005-39781 has disclosed an audio-visual system (an information-receiving-and-transmitting system) that is available for viewing and listening to a broadcast program received by a television tuner on a real-time basis via a network channel such as the Internet with a user carrying a terminal that has a display device to a place where the user has gone to and controlling a video apparatus or the like installed in his or her home.

As the terminal, in addition to a special monitor, a personal computer (PC) such as a notebook computer and a game console such as PlayStation Portable (PSP), trademark, and the like are used. As the video apparatus, in addition to a television tuner, a digital versatile disc (DVD) player, a video tape recorder (VTR), a set-top box (STB) and the like are used. These external video apparatuses are controlled by a sending apparatus installed inside a room.

Accessing this sending apparatus with the terminal that is carried to a place where the user has gone to (his or her new place of appointment or a place where he or she is now staying), which is referred to as "on-the-road" hereinafter, through the Internet enables the sending apparatus itself to be controlled and/or any of the external video apparatuses to be controlled. This allows a user to enjoy a program recorded on the DVD by controlling the DVD player or the like at his or her on-the-road. This also allows a user to enjoy on a real-time basis at his or her on-the-road a broadcast program that is tuned by a tuner built in the sending apparatus by controlling the tuner and sending the tuned broadcast program to his or her on-the-road.

Suppose that the terminal is placed at a place other than a place where the sending apparatus is installed, for example, the external video apparatus and the sending apparatus are installed at a first floor of user's house and the terminal is used at a second floor thereof. Even if a family of the user views and listens to a program displayed on the television receiver installed in the first floor or reproduced by the external video apparatus also installed in the first floor, the user can view and listen to a program by using this information-receiving-and-transmitting system. For example, when the user carries the terminal in his or her room of the second floor of the user's house and controls the sending apparatus installed in the first floor thereof by the terminal, the user can view and listen to a program displayed on a television receiver in his or her room on a real-time basis or reproduced by an external video apparatus through the terminal.

SUMMARY OF THE INVENTION

By the way, such the terminal may be provided with a display device having a smaller display size essentially if taking its convenience into consideration to keep its good carrying property maintained. The display device has a smaller display size so that an image may be displayed thereon without any realism sometimes, thereby disabling it to bring a good feeling of satisfaction to the user. In a case of an installed television receiver, it is mostly provided with a display device having a larger display screen size than that of the terminal so that such the malfunctioning can be swept away.

Thus, if a television receiver installed at a user's on-the-road is used as an image-displaying device, a receiving apparatus that acts as a relay apparatus of program information may be provided instead of the terminal. The receiving apparatus is provided between the sending apparatus and the television receiver in user's home or between a local area network (LAN) and the television receiver in his or her on-the-road. Of course, the receiving apparatus has no display device so that the user can carry the receiving apparatus easily up to his or her on-the-road.

Even if the receiving apparatus having a relay transformation function and having no display device is used, it is possible to construct an information-receiving-and-transmitting system similar to that using the above-mentioned terminal.

In such the information-receiving-and-transmitting system using the receiving apparatus, an image-display mode (a use mode) in which a user views and listens to a program of the terminal on his or her home having the sending apparatus installed therein is referred to as "home area mode" while an image-display mode in which a user enjoys a program through the terminal by controlling a television tuner or the like installed in his or her home is referred to as "on-the-road area mode". In the home area mode, the sending apparatus is connected to the terminal through an LAN in the user's home.

The connection mode therefor includes a wired LAN mode in which the sending apparatus is connected to the terminal through an LAN cable and a wireless LAN mode in which the sending apparatus is connected to the terminal through wireless.

If a user communicates with the sending apparatus that acts as a base station connected with the LAN (a network) through the receiving apparatus, whether or not the sending apparatus is connected to the LAN is first examined as an initial setting of the communication even when the communication is carried out by using the wired LAN mode and the wireless LAN mode. In the home area mode, communication is carried out through the LAN in the user's home so that the sending apparatus connected to this LAN can be easily confirmed. In other words, it is possible to confirm the sending apparatus completely as network-connected equipment.

In the on-the-road area mode, however, the receiving apparatus is connected to the LAN in the on-the-road of the user, so that it is difficult for the receiving apparatus to confirm that the sending apparatus as the base station is connected to any external LAN as the network-connected equipment. This disables the receiving apparatus to communicate with the sending apparatus so that in a case of usage of the receiving apparatus under such the on-the-road area mode, the receiving apparatus is at least connected to the Internet and access the sending apparatus (as a communication-establishing process).

Even if an operation procedure for a user to use the receiving apparatus in the on-the-road area is written in a manual therefor, it is difficult for the user to solve any troubles rapidly in his or her on-the-road mainly unless he or she has some technical knowledge on a network when the user has not such the manual in his or her on-the-road area.

It is thus desirable to provide a communication-processing method on network-connected equipment and a receiving apparatus, in which a correct operation procedure can be displayed on its display screen, if necessary, even when the receiving apparatus is used in any places and the user can use the correct operation procedure with paying no regard to the home area mode and the on-the-road area mode.

According to an embodiment of the present invention, there is provided a communication-processing method that performs communication processing on network-connected equipment. The method includes the steps of sending an identification signal through a network to every apparatus that is connected in an identical network circuit to identify a local (specified) apparatus, and determining whether a reply signal including identification information in reply to the sent identification signal is received or not. The method also includes the steps of deciding that the local apparatus is connected to the identical network circuit if receiving the reply signal including the identification information to secure a communication-processing condition for the identified local apparatus, communicating with the identified local apparatus, and sending the communication-processing condition to the identified local apparatus.

The communication-processing method is available for the information-receiving-and-transmitting system in which a user can view and listen to program information including image information received from a video apparatus by utilizing a television receiver installed in a place other than a place where the video apparatus or the like is installed or a user's on-the-road area.

This information-receiving-and-transmitting system contains a receiving apparatus and a sending apparatus that the receiving apparatus accesses. The sending apparatus acts as a base station to constitute network-connected equipment that is connected to the LAN in the user's home. The sending apparatus includes a television tuner and an input terminal for an external video apparatus. The sending apparatus switches video inputs for them from each other and outputs the switched one. The sending apparatus, for example, compresses and encodes program information including image information and audio information according to, for example, MPEG standard so that the compressed and encoded program information can be packetized and output.

The receiving apparatus receives the program information from the sending apparatus and decodes the program information to reconstitute it to a television signal constituted of a composite signal or a separate signal.

The program information is received through an LAN in the user's home or a network circuit such as the Internet. Since an LAN (an external LAN) is laid between the Internet and the receiving apparatus, the receiving apparatus accesses the sending apparatus through the external LAN.

Thus, decoding the program information received through the LAN and/or the Internet to reconstitute the television signal allows a user to enjoy a program by supplying an existing television receiver with this television signal. In other words, the existing television receiver can be used as an image-displaying device.

In order for the receiving apparatus to access the sending apparatus to communicate with the sending apparatus, any initial communication processing is carried out as an assumption processing thereof. In the communication processing, the receiving apparatus first sends a broadcast packet signal to every apparatus connected to the network circuit. The broadcast packet signal is used for searching the sending apparatus connected to the LAN (the network circuit) in the user's home. The sending apparatus sends a reply signal including any special identification information (i.e., identifier) back to the receiving apparatus.

In the reply signal from the network-connected equipment other than the sending apparatus, no identifier is included. When network-connected equipment other than the receiving apparatus sends the broadcast packet signal, the identifier is included in the reply signal received from the sending apparatus but this identifier is unavailable for the equipment other than the receiving apparatus so that the received reply signal is cancelled in the equipment.

When the receiving apparatus receives the reply signal including the identifier, the receiving apparatus can confirm that the sending apparatus resides within this network circuit to secure a communication-processing condition for the home area mode. For example, first, a data-processing scheme for the program information is set for the home area mode and, second, a communication rate is also set for the home area mode.

If it is confirmed that the sending apparatus resides within the identical network circuit, the receiving apparatus carries out any communication with the sending apparatus as a next step. If the communication is established, the sending apparatus performs any data processing on the program information based on the secured communication condition and sends the processed data back to the receiving apparatus.

If it is not confirmed that the sending apparatus resides within the same network circuit, in other words, the receiving apparatus is connected with an LAN, which is connected to the Internet, out of the user's home, the sending apparatus receives no broadcast packet signal so that the sending apparatus sends no reply signal. Accordingly, the receiving apparatus receives no reply signal including the identifier. This enables the receiving apparatus to check that the sending apparatus does not reside within the same network circuit.

In this moment, a sending apparatus with which the receiving apparatus communicates is specified and then, any communication-processing condition for the on-the-road area mode is secured. The communication-processing condition for the on-the-road area mode is different from that for the home area mode so that a data-processing scheme, which is different from that used in the home area mode, can be set and communication rate, which is different from that used in the home area mode, can be set.

The receiving apparatus is automatically connected to the Internet after such the communication-processing conditions have been secured. This enables the receiving apparatus to access the sending apparatus that is connected to the Internet, thereby allowing the sending apparatus to communicate with the receiving apparatus.

In the above embodiment of the invention, according to the communication-processing method, sending the broadcast packet signal including the identifier for identifying a local apparatus enables the receiving apparatus to confirm that the sending apparatus resides within the identical network circuit automatically. This allows the following communication-processing conditions to be automatically secured. Thus, it is possible to establish the communication with the network-connected equipment with paying no regard to a condition where the network-connected equipment that the receiving apparatus can access resides within the identical network circuit.

According to another embodiment of the present invention, there is provided a receiving apparatus. The receiving apparatus contains sending device that sends an identification through a network to every apparatus that is connected in an identical network circuit to identify a local apparatus, determining device that determines whether a reply signal including identification information in reply to the sent identification signal is received or not, setting device that decides that the local apparatus is connected to the identical network circuit if receiving the reply signal including the identification information and sets a communication-processing condition for the identified local apparatus, and a local area network interface through which communication with identified local apparatus is performed.

In the above another embodiment of the invention, according to the receiving apparatus, it is determined whether the receiving apparatus resides within the LAN in the user's home or the external LAN, based on whether or not the identifier for identifying the sending apparatus is included in the reply signal by sending the broadcast packet signal including the identifier by the receiving apparatus. Based on the determined result thereof, the receiving apparatus secures the communication-processing condition for the home area mode or the on-the-road area mode. Thus, the receiving apparatus can access the sending apparatus with paying no regard to any used place of the receiving apparatus, based on a series of such the determination and secure processing events.

The receiving apparatus automatically confirms that the sending apparatus to be subject to any network-connected equipment resides within the identical network circuit, thereby allowing the corresponding communication-processing condition therefor to be secured. Thus, it is possible to establish the communication with the network-connected equipment with paying no regard to a condition where the receiving apparatus is used in the LAN in the user's home or the external LAN.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is a plan view of a remote control for illustrating an example of manual operation buttons that control a receiving apparatus and the like;

DESCRIPTION OF THE PREFERRED EMBODIMENTS

The following will describe preferred embodiments of the communication-processing method on the network-connected equipment and the receiving apparatus according to the present invention with reference to the accompanied drawings.

(Information-Receiving-and-Transmitting System)

Figure 1:
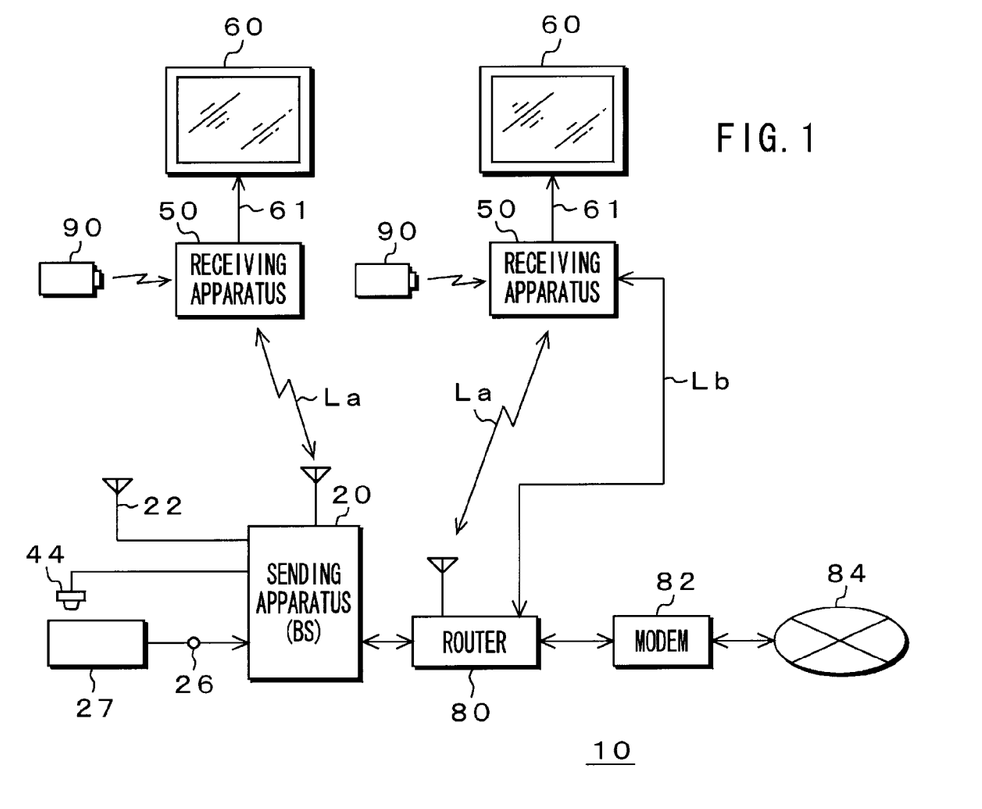
FIG. 1 is a schematic diagram for showing an embodiment of an information-receiving-and-transmitting system, to which the invention is applicable.

This invention is applicable to the information-receiving-and-transmitting system. The information-receiving-and-transmitting system contains an information-sending apparatus (hereinafter, referred to as "sending apparatus" or "sending apparatuses") 20 and information-receiving apparatuses (hereinafter, referred to as "receiving apparatus" or "receiving apparatuses") 50 as shown in FIG. 1. Each existing television receiver 60 acting as an image display device displays information received by the corresponding receiving apparatus 50. When the sending apparatus 20 is installed in a first floor of the user's house, the television receiver 60 and the receiving apparatus 50 are respectively installed in another room of the first floor thereof or another floor thereof so that information is received or transmitted between them with the television receiver 60 and the receiving apparatus 50 being positioned away from the sending apparatus 20.

The sending apparatus 20 is connected to the receiving apparatus 50 through any wired or wireless communication. The communication is performed through a wired LAN conforming to IEEE802.3 standard or a wireless LAN conforming to IEEE802.11a/b/g standards. FIG. 1 shows an example where the sending apparatus 20 is connected to the receiving apparatus 50 through wireless LAN La and an example where the sending apparatus 20 is connected to the receiving apparatus 50 through a wired LAN constituted by connecting a router 80 that is connected to the sending apparatus 20 with the receiving apparatus 50 through a LAN cable Lb. Accordingly, each of the sending apparatus 20 and the receiving apparatuses 50 is provided with an LAN interface, which will be described later.

A control signal received from any one of the receiving apparatuses 50 controls the sending apparatus 20. A remote control 90 controls each receiving apparatus 50. A user selects any item(s) displayed on a screen of each television receiver 60 to control any information. Each receiving apparatus 50 stores any software for display control relative to contents of items and the like to be displayed on the screen of the television receiver 60. A remote control signal controls selections of the software, the displayed items (menu representation) and the like.

A television tuner, which will be described later, is built in the sending apparatus 20. An external antenna 22 receives a television signal (for example, a terrestrial analog television signal) and the built-in television tuner then receives the television signal. Thus, a channel select signal received from the receiving apparatus 50 enables the television tuner to select the channel. Accordingly, the remote control 90 controls the channel selection.

The sending apparatus 20 is also provided with an external input terminal 26. A video apparatus (an external video apparatus) 27 is connected to the external input terminal 26. The external video apparatus 27 contains a DVD player, VTR, and STB. FIG. 1 shows a case where the DVD player is used as the external video apparatus 27. A reproduction or the like of the DVD is controlled by any receiving apparatuses 50 through the sending apparatus 20. Although one external input terminal has been illustrated in FIG. 1, numbers of the external input terminal are optional so that plural video inputs can be received therethrough. In order for the sending apparatus 20 to control the DVD player, a device-controlling element 44 for irradiating a control signal (a remote control signal) is set near a photodetector in the DVD player.

The sending apparatus 20 converts program information including image information to sending information having a format that is suitable for the sending. For example, the program information including image information and audio information is compressed and encoded based on MPEG format and then, its elementary stream (ES) is encrypted and packetized to be sent. The packet information is sent through a wired or wireless communication. In the wireless communication, it is encrypted twice, which is different from that of the wired communication. This is because the information is highly concealed. The encryption is performed based on a data encryption standard (DES), an advanced encryption standard (AES), a wired equivalent privacy (WEP) standard or any other encryption standards.

After establishing any communication between the sending apparatus 20 and any receiving apparatuses 50, the sending apparatus 20 sends the packet information to the receiving apparatus 50. The receiving apparatus 50 receives the packet information and decodes it to generate the television signal. In order to generate the television signal, an MPEG decoder, which will be described later, extends and decodes it. Among pieces of the decoded information, the audio information is converted into an analog audio signal that is then supplied to an output terminal of the receiving apparatus 50.

The decoded image information is further encoded according to an appropriate television format and reconstituted into a television signal of an NTSC format or a PAL format including a synchronizing signal, which is supplied to an output terminal of the receiving apparatus 50.

If the sending information sent from the sending apparatus 20 contains image information and any accompanying information for controlling the image information, its processing information is sent at the same time. The accompanying information indicates to copy-guard information such as copy generation management system (CGMS) and Macrovision information as copy control information.

When the receiving apparatus receives such the accompanying information together with the image information, the accompanying information is decrypted and brought back to the original one, which is inserted and added into the image signal. This species of piece of the accompanying information is generally inserted into a television signal within a vertical blanking period of time thereof, namely, a predetermined horizontal period within the vertical blanking period of time.

As the television signal, both of the composite signal and the separate signal are output. The receiving apparatus 50 has output terminals (image and audio terminals) for the composite signal and an output terminal (so-called S terminal) for the separate signal. If the television signal received at the receiving apparatus 50 contains any accompanying information, the television signal (the composite signal and the separate signal) is output from the output terminals of the receiving apparatus 50 with the accompanying information being added and inserted into the television signal. This is because any copy control or the like can be performed according to the accompanying information when a copying device such as a VTR and a DVD recorder is connected to the output terminal and performs any copy.

Each of the output terminals of the receiving apparatus 50 is connected to the television receiver 60 through a special cable 61. This enables control information from the remote control 90 and the received image to be displayed on a screen of the television receiver 60.

The router 80 is connected with a network circuit (the Internet) 84 through a modem 82, as shown in FIG. 1. The modem 82 contains any modem that is selectively available under its use environment such as a modem for asymmetrical digital subscriber loop (ADSL) or integrated services digital network (ISDN) and a modem for an optical fiber.

Under the information-receiving-and-transmitting system as shown in FIG. 1, a user can access a Web server, not shown, that is connected to the Internet 84 through any receiving apparatuses 50 and the sending apparatus 20 by manipulating the remote control 90. The television receiver 60 acquires any information relative to the Web page in the Web server and displays it.

Further, the information-receiving-and-transmitting system 10 can receive and transmit any information. For example, the television receiver 60 displays a software keyboard on its screen to write a mail thereby and access a mail server, not shown, to send the mail to the mail server. When receiving the mail, the television receiver 60 also displays its contents on its screen.

According to the information-receiving-and-transmitting system 10, it is possible to view and listen to any broadcast program received at the sending apparatus 20 on a real-time basis by using the television receiver 60 that is installed in a room other than a room in which the sending apparatus 20 is installed. It is also possible to acquire various kinds of pieces of the information by accessing the Web page.

(Remote Control)

Figure 2:
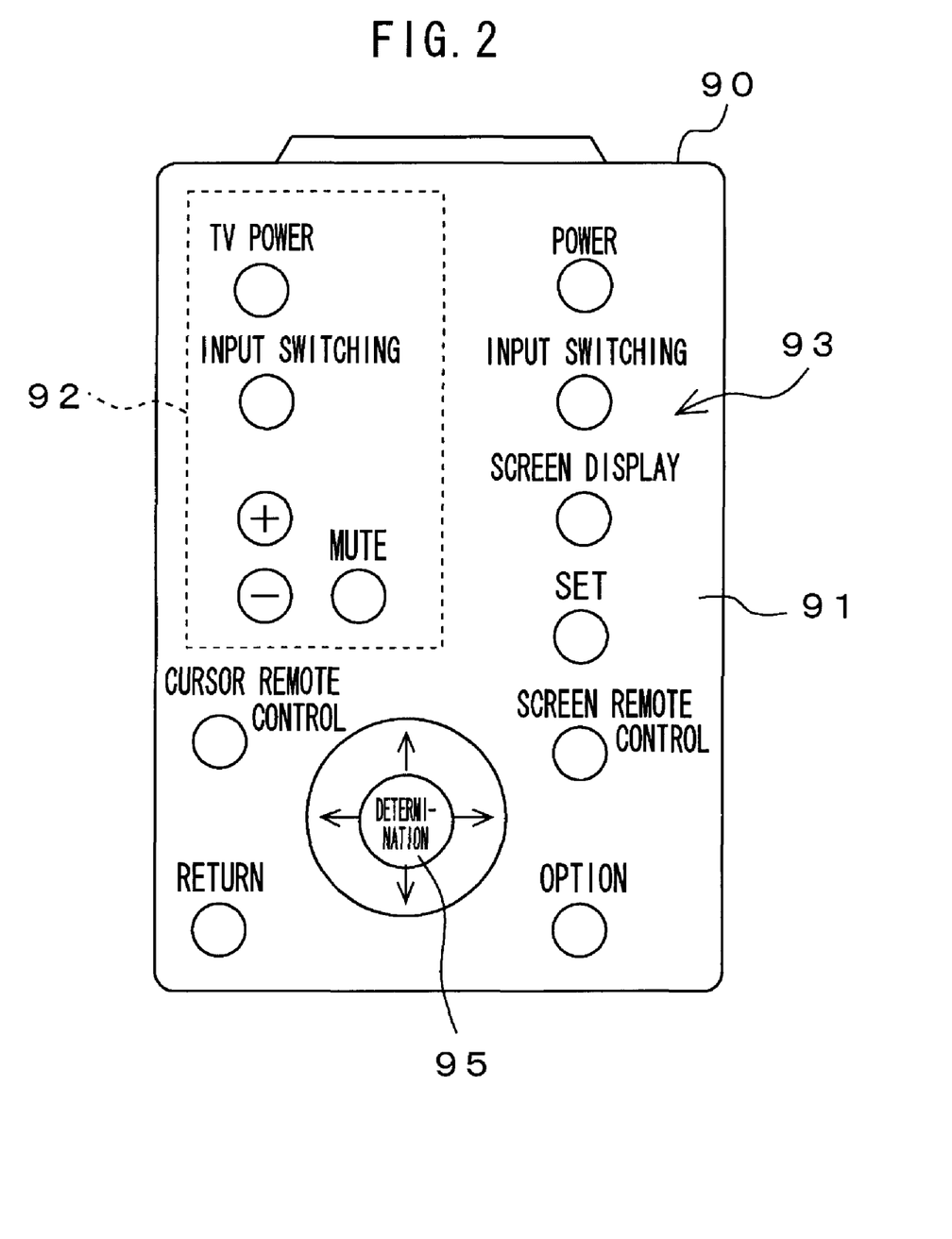

FIG. 2 illustrates an example of the remote control 90 that realizes the above-mentioned processing. On a remote control main body 91, there are a group of manual operation buttons 92 that control a power of the television receiver itself, volume and the like and a group of manual operation buttons 93 that control any receiving apparatus 50 and the sending apparatus 20 through the receiving apparatus 50 or the like. Cursor keys on which arrows are shown and a determination button 95 are positioned below a middle of the main body 91. The remote control 90 uses infrared ray (IR) to send a remote control signal.

In the group of manual operation buttons 92, there is a power-on-or-off button that controls a power of the television receiver 60 to be set on or off. An input-switching button is a button used when inputs for the television receiver 60 are switched. Volume is adjusted by using plus and minus buttons. Pushing a mute button enables sound to be muted temporarily.

In the group of manual operation buttons 93, an input-switching button is a button that controls an input selection portion in the sending apparatus 20 and a screen display button is a button that displays an operation state of a current receiving apparatus 50 and/or an operation state of the external video apparatus 27 on an upper portion of a screen of the television receiver 60 by a bar representation. A set button is a button used when the television receiver 60 displays a setting screen. A screen remote control button is a button used when selecting items displayed on a screen of the television receiver 60 by using any cursor keys.

Pushing an option button enables circuit-connection processing with the sending apparatus 20 to be carried out. Pushing an option button also enables adjustment processing of image and audio relative to the television receiver 60 and/or DVD at a side of the sending apparatus 20 to be carried out together with the cursor keys. A cursor remote control button is a button used when directly selecting a menu screen, which is displayed on the television receiver 60, for the external video apparatus 27 connected to the sending apparatus 20. A return button is a button used when a page screen is returned to a previous one.

An icon, not shown, for indicating a connection state of the receiving apparatus 50 with the sending apparatus 20 is displayed on the screen of the television receiver 60. This icon indicates a circuit connection state (connected or not connected) through the wireless LAN, a circuit connection state (connected or not connected) through the wired LAN, and a connection state of the receiving apparatus 50 with the sending apparatus 20.

Figure 3:
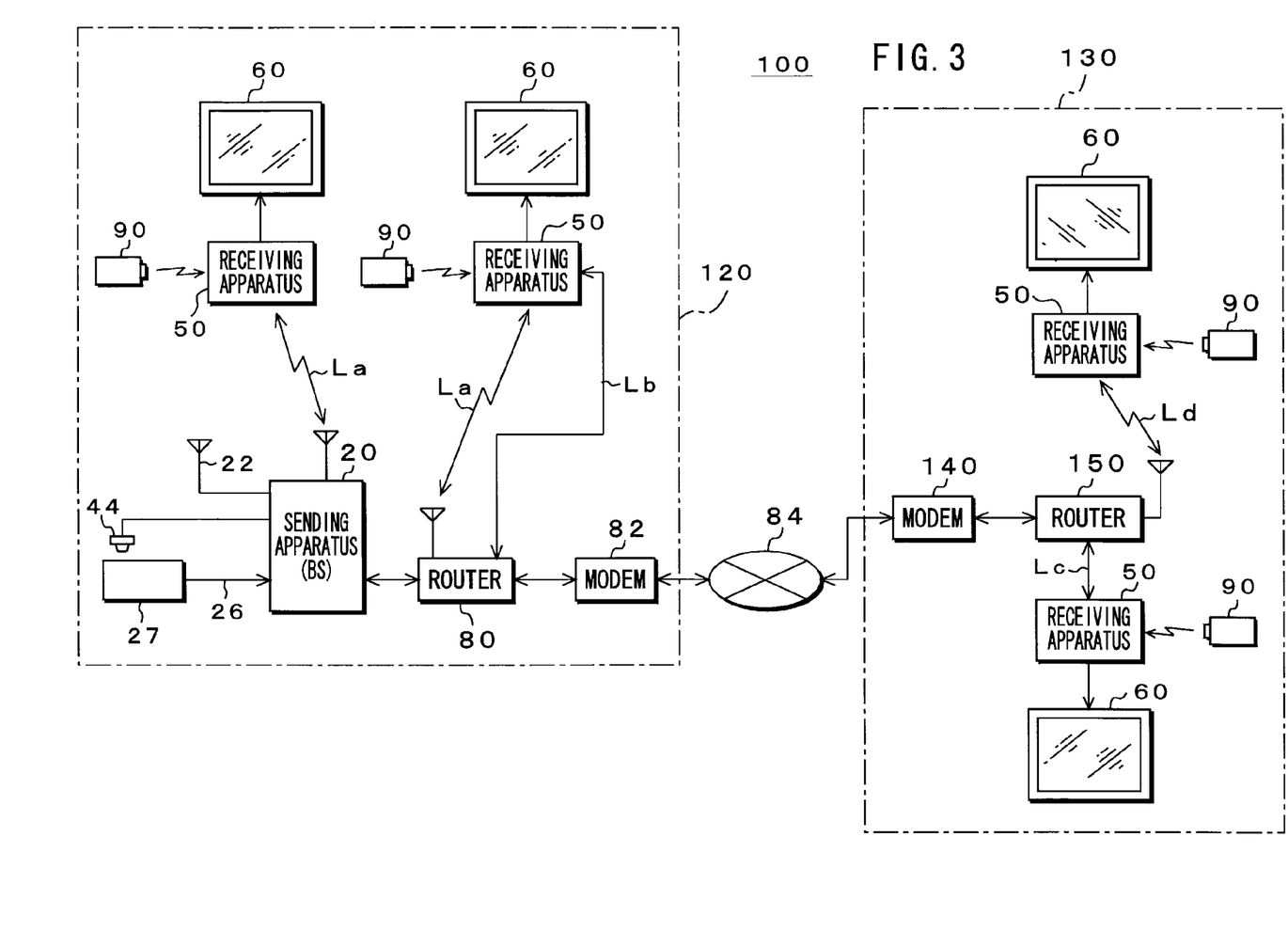
FIG. 3 is a schematic diagram for showing another embodiment of the information-receiving-and-transmitting system, to which the invention is applicable.

FIG. 3 shows an information-receiving-and-transmitting system 100 to which another embodiment of the invention is applicable. This information-receiving-and-transmitting system 100 is used in a case where a user goes to a place other than his or her home, namely, in an on-the-road area such as his or her new place of appointment or a place where he or she is now staying and he or she communicates with network-connected equipment installed in his or her home. It is to be noted that like reference characters shown in FIG. 3 refer to like elements shown in FIG. 1, detailed description of which will be omitted.

The following will describe a home area 120 and an on-the-road area 130 separately as shown in FIG. 3 for convenience in writing. The home area 120 contains a sending apparatus 20, an external video apparatus 27 that is connected to the sending apparatus 20, a router 80, and a modem 82, the router 80 and the modem 82 connecting the Internet 84. The home area 120 may also contain plural receiving apparatuses 50 and plural television receivers 60.

The on-the-road area 130 contains a modem 140 for connecting the Internet 84, a router 150 for LAN, which is used for connecting the modem 140, and a television receiver 60. The on-the-road area 130 may also contain plural receiving apparatuses 50 and plural television receivers 60 as shown in FIG. 3. If a user enjoys a program by using the television receiver(s) 60, a single receiving apparatus or plural receiving apparatuses 50 is or are connected to the router 150 acting as an access point and each of the television receiver(s) 60 through the LAN. Such the LAN includes a wired LAN in which the router 150 and the receiving apparatus 60 are connected to each other through an LAN cable Lc and a wireless LAN in which the router 150 and the receiving apparatus 60 are connected to each other through a wireless LAN Ld, as shown in FIG. 3.

The user starts up any receiving apparatus 50 in the on-the-road area 130. The receiving apparatus 50 accesses the sending apparatus 20 installed in the home area 120 through the Internet 84 and the sending apparatus 20 then establishes its communication with the receiving apparatus 50. Thereafter, the user selects sending medium such as an image. For example, the tuner built in the sending apparatus 20 is controlled. The sending apparatus 20 sends any broadcast program information that is now broadcasting, on which the tuner has selected a channel, to the receiving apparatus 50 through the Internet 84. Thus, the user can view and listen to the broadcast program that is now broadcasting on a real-time basis by utilizing the receiving apparatus 60 installed in the on-the-road area 130. When the user also uses the receiving apparatus 50 installed in the on-the-road area 130 to control the external video apparatus 27 such as a DVD player installed in the home area 120, the user can view and listen to a program of DVD reproduced by the DVD player. The user can also access a Web server that is connected to the Internet 84 to write a mail or to send or receive any information therethrough.

It is to be noted that although the receiving apparatus 50 installed in the on-the-road area 130 may be identical to or separated from the receiving apparatus 50 installed in the home area 120, the receiving apparatus 50 is initially set so that it can access the sending apparatus 20 even if the user carries the receiving apparatus 50 that is separated from the receiving apparatus 50 installed in the home area 120.

(Sending Apparatus)

Figure 4:
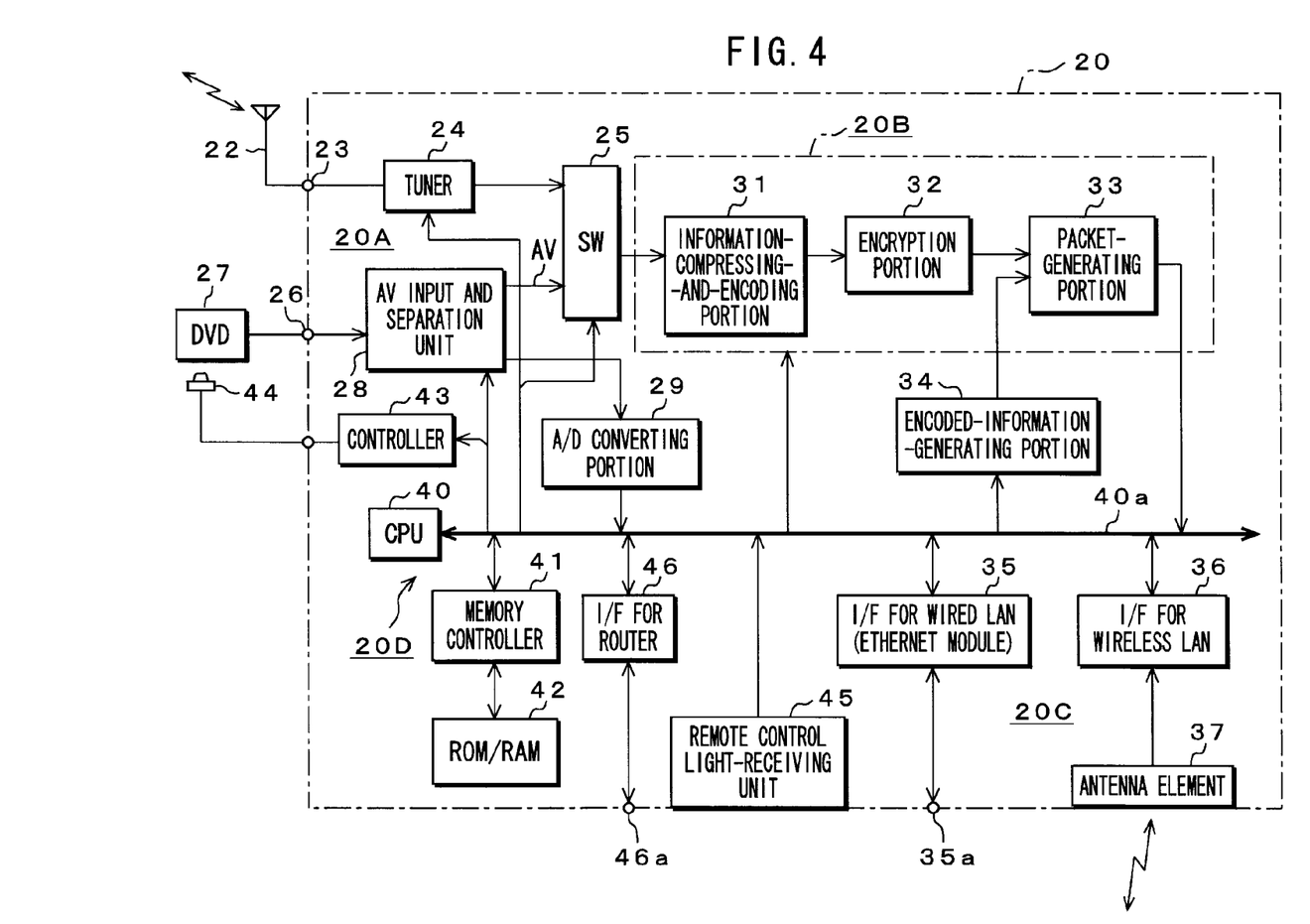
FIG. 4 is a schematic diagram for showing a substantial part of an embodiment of a sending apparatus.

FIG. 4 shows a configuration of an embodiment of the sending apparatus 20. The sending apparatus 20 contains a receiving portion 20A that receives program information including image and audio information, a signal-processing portion 20B that converts the received program information into data having a format that is suitable for sending, an LAN interface portion 20C, and a control portion 20D that controls the receiving portion 20A, the signal-processing portion 20B, the LAN interface portion 20C, and the external video apparatus 27, respectively.

In the receiving portion 20A, a television signal such as a terrestrial analog television signal that is received at an antenna 22 is supplied to the tuner 24 through an input terminal 23 of the sending apparatus 20. The tuner selects a channel for a desired broadcast station. A broadcast program of the selected channel is supplied to a signal-switching unit (SW) 25.

The external video apparatus 27 is connected to another input terminal 26 of the sending apparatus 20. The external video apparatus 27 contains a DVD player or recorder, a VTR, and an STB. In a case shown in FIG. 4, the DVD player or recorder is connected to the input terminal 26 as the external video apparatus 27. The program information including image information and audio information, which is acquired from DVD reproduced by the DVD player or recorder, is supplied to an audio-video (AV) input and separation unit 28 through the input terminal 26 so as to be separated into a program information part thereof (if this is an image signal, a valid pixel part thereof) and a blanking part thereof.

The program information part is supplied to the signal-switching unit 25. The blanking part is supplied to an analog-to-digital (A/D) converting portion 29 wherein it is converted into a digital signal. The converted digital signal is then supplied to the control portion 20D. The blanking part includes information relative to both of a horizontal blanking period of time and a vertical blanking period of time.

Thus, the blanking part is separated from the program information part in the AV input and separation unit 28. This is because any accompanying information for controlling the image information or the like may be inserted and added to a blanking period of time therefor in any program information output from the DVD. If the accompanying information is added thereto, any signal processing may be performed with this accompanying information being separated from any other information.

Such the accompanying information includes copy guard information, and information relative to a wide-detection signal for switching a display image size. The copy guard information relates to information indicating that the reproduced information is able to be copied (written), written once, or prohibited from being copied. The copy guard information includes Copy Guard Management System (CGMS) that is copy management information, and Macrovision information.

The signal-switching unit 25 switches between a television signal and the above program information part. Selected one (hereinafter, referred to as "selected information") is then supplied to the signal-processing portion 20B. The signal-processing portion 20B converts the selected information into a signal format (a data format) that is suitable for transmitting under the control of the control portion 20D. In this embodiment, the signal-processing portion 20B performs signal processing such that data is compressed according to MPEG-2 standard or MPEG-4 standard. Accordingly, the signal-processing portion 20B acts as an MPEG encoder.

The signal-processing portion 20B contains an information-compressing-and-encoding portion 31, an encryption portion 32, and a packet-generating portion 33. The information-compressing-and-encoding portion 31 performs any digital conversion and any compression-and-encode processing on the above-mentioned selected information to generate image and audio elementary streams (ES) based on the MPEG standard.

Next, the encryption portion 32 encrypts these mage and audio elementary streams. Such the encryption includes the above-mentioned DES, AES, and WEP. In a case of wired LAN, any one of the DES and AES is adopted while in a case of communication through wireless LAN, double encryption such that encryption is performed based the AES and then, further encryption is performed based the WEP is adopted with taking any confidentiality into consideration. Thus, encryption is selected in the encryption portion 32 depending on which the communication through the wired LAN or the communication through the wireless LAN.

The image and audio elementary streams thus encrypted are supplied to the packet-generating portion 33 where any packet generation processing is performed according to a predetermined protocol.

The packet generation processing in a home area 120 in which the receiving apparatus 50 is installed and used (hereinafter, referred to as "home area mode") as shown in FIG. 3 is different from that in an on-the-road area 130 in which the receiving apparatus 50 is installed and used (hereinafter, referred to as "on-the-road area mode").

In the home area mode, a program stream PS (MPEG-PS) generated by using plural packetized elementary streams (PES) is generated as a packet having a format stipulated by User Datagram Protocol/Internet Protocol (UDP/IP) of OSI reference model. The program stream PS is generated because the receiving apparatus 50 is used under a low-error-occurrence environment (in user's home). In this moment, its transfer rate is secured to a high-bit rate (about 10 Mbps).

In the on-the-road area mode, a transport stream TS (MPEG-TS) generated by using plural packetized elementary streams (PES) is generated as a packet having a format stipulated by Real-time Transport Protocol/Internet Protocol (RTP/IP) of OSI reference model. The transport stream TS is generated because the receiving apparatus 50 is used under an error-occurrence environment. In this moment, its transfer rate is secured to about 300 through 500 kbps, which is made different under any Internet environments.

The receiving apparatus 50 examines whether an identified sending apparatus 20, which is network-connected equipment, stays within LAN with which the receiving apparatus 50 can communicate when the receiving apparatus is powered. If the identified sending apparatus 20 stays within this LAN, the receiving apparatus 50 determines that its signal processing may be performed based on the home area mode and instructs the sending apparatus 20 to perform any signal processing based on the home area mode.

As in a case where the receiving apparatus 50 is used in the on-the-road area, if the identified sending apparatus 20 stays out of the LAN (LAN in the on-the-road area), the receiving apparatus 50 determines that its signal processing may be performed based on the on-the-road area mode and instructs the sending apparatus 20 to perform any signal processing based on the on-the-road area mode. Based on the instruction relative to the signal processing under any modes, the above-mentioned signal processing is carried out.

The packet-generating portion 33 also packetizes the accompanying information in addition to the above-mentioned selected information. For example, if the selected information includes the accompanying information, this accompanying information is also packetized and transferred.

If the selected information includes the accompanying information, an encoded-information-generating portion 34 encodes the accompanying information at the timing of addition of the accompanying information. The encoded accompanying information is packetized in the packet-generating portion 33 after any format processing has been performed based on a format that is applicable for the above-mentioned information-receiving-and-transmitting system. The accompanying information packet is generated as a packet having a format stipulated by Transmission Control Protocol/Internet Protocol (TCP/IP) so that if an error occurs in a transmission channel, the error can be handled.

The encoded-information-generating portion 34 generates encoded accompanying information at only two times of timing at the horizontal scanning period in the first blanking period of time in which the accompanying information is added and timing at the horizontal scanning period in the last blanking period of time in which the accompanying information is added. This is because an amount of information is decreased since same information is transmitted within a period of time in which the accompanying information is added.

The accompanying information is not transmitted within all the period of time in which the accompanying information is added, but the accompanying information and its related information are transmitted at only first and last of a period of time in which the accompanying information is added. In other words, the accompanying information is transmitted with the information being compressed. Information indicating a species of the accompanying information and information indicating a start and an end of the accompanying information are encoded. This enables an amount of the information to be transmitted to be considerably decreased. Transmission form (pattern) of the accompanying information is not limited thereto, but an intermittent one, for example, such that the accompanying information is transmitted every set interval may be used.

The LAN interface portion 20C contains an interface 35 for wired LAN and an interface 36 for wireless LAN. An LAN connector 35a is connected with an input of the interface 35 for wired LAN and the control portion 20D is connected with an output of the interface 35 for wired LAN. An antenna element 37 for receiving and transmitting a signal is connected with an input of the interface 36 for wireless LAN. The control portion 20D is connected with an output of the interface 36 for wireless LAN. An interface 46 for router, which has a connector 46a, is connected with an internal bus 40a constituting the control portion 20D. Of course, the interface 46 for router may be also used as the interface 35 for wired LAN. In this embodiment, the above-mentioned interfaces 35, 36 are constituted of LAN interfaces following IEEE802.3 standard or IEEE802.11a/b/g standards.

The LAN interface portion 20C communicates with the receiving apparatus 50 and based on the received information, the sending apparatus 20 is controlled and connected with the Internet 84 as well as the external video apparatus 27 is also controlled.

The control portion 20D contains a control device 40 such as a central processing unit (CPU) for controlling the entire sending apparatus 20, a memory controller 41 connected with the internal bus 40a, and a memory 42 connected to the internal bus 40a through the memory controller 41. The memory 42 is constituted of a read only memory (ROM) storing various kinds of processing program and a random access memory (RAM) acting as working area. The control portion 20D also contains a remote control light-receiving unit 45 that receives light from the remote control 90. The control portion 20D receives the light from the remote control light-receiving unit 45.

The control portion 20D generates control signals for the tuner 24 and the signal-switching unit 25, which constitute the receiving portion 20A, and supplies the AV input and separation unit 28 with a separation signal to separate a signal from the external video apparatus 27 into a blanking part thereof and a part thereof other than the blanking part. The control portion 20D also generates a control signal for performing any remote control on the external video apparatus 27 such as a DVD player. In this embodiment, it supplies this control signal through a controller 43 to the device-controlling element 44 such as light-emitting element for a light control signal (infrared ray signal), which is positioned near a light-receiving portion of the external video apparatus 27.

The control portion 20D performs any control processing for the signal-processing portion 20B relative to the home area mode and the on-the-road area mode. The control portion 20D further performs any packet generation processing if the accompanying information is contained.

A predetermined packet data generated in the signal-processing portion 20B is then transmitted to the receiving apparatus or apparatuses 50 installed in the home area 120 and the receiving apparatus or apparatuses 50 installed in the on-the-road area 130 connected to the Internet 84 through the interface 35 for wired LAN and/or the interface 36 for wireless LAN. The sending apparatus 20 performs any data-receiving-and-sending processing such that any information is received from a Web server connected the Internet 84 through the router 80 and sent to the receiving apparatus or apparatuses 50.

(Receiving Apparatus)

Figure 5:
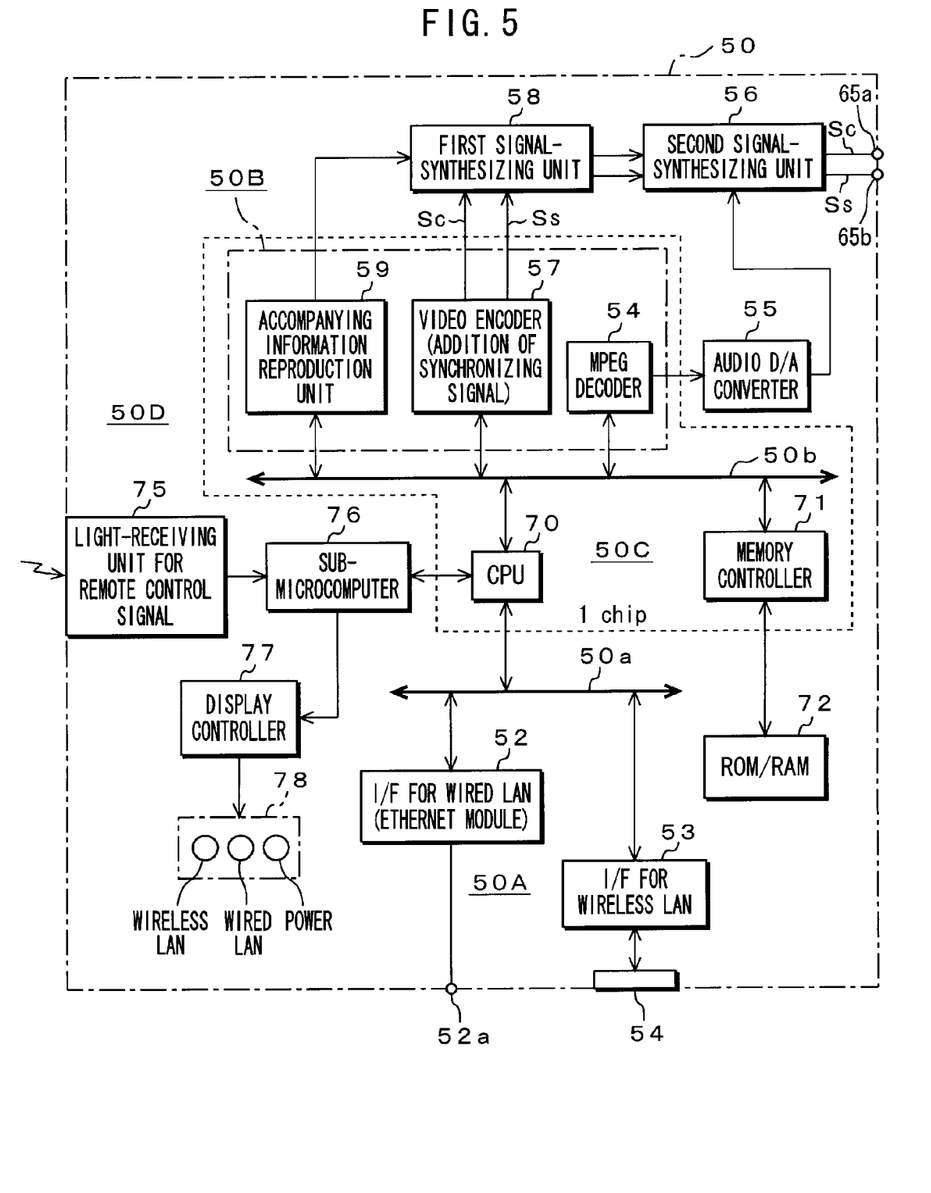
FIG. 5 is a schematic diagram for showing a substantial part of an embodiment of a receiving apparatus.

FIG. 5 shows a configuration of an embodiment of the receiving apparatus 50. The receiving apparatus 50 contains an LAN interface portion 50A, a signal-processing portion 50B that restores a signal received at the LAN interface portion 50A to its original signal, a control portion 50C, and a processing portion 50D for processing a remote control signal.

The LAN interface portion 50A acts as an interface for receiving any informational signal from the sending apparatus 20 and sending a control signal or the like to the sending apparatus 20. The LAN interface portion 50A is also constituted of LAN interface following IEEE802.3 standard or IEEE802.11a/b/g standards. The LAN interface portion 50A contains an interface 52 (Ethernet (trademark) module) for wired LAN and an interface 53 for wireless LAN. The interface 52 for wired LAN has an LAN connector 52a and the interface 53 for wireless LAN has an antenna element 54.

These interfaces 52, 53 are connected to an internal bus in CPU 70 constituting the control portion 50C, which will be described later, through PCI bus 50a. The informational signal received by the interfaces 52, 53 is supplied to the signal-processing portion 50B under the control of the CPU 70.

The signal-processing portion 50B acts as an MPEG decoder unit. The signal-processing portion 50B contains an MPEG decoder 54 that is connected to an internal bus 50b, a video encoder 57 to which program data output from the MPEG decoder 54 is supplied, and an accompanying information reproduction unit 59 that decodes the encoded accompanying information.

The MPEG decoder 54 receives an informational signal (a data signal) and decrypts the image elementary stream and the audio elementary stream following MPEG standard, which are included in the received informational signal, that have been encrypted and packetized. The MPEG decoder 54 also performs extension and decoding on such the image elementary stream and the audio elementary stream. An audio digital to analog (D/A) converter 55 receives the decoded audio elementary stream and restores it to an analog audio signal thereof. A second signal-synthesizing unit 56 then receives this analog audio signal.

The video encoder 57 (an encoder for an image signal) receives the decoded image elementary stream and performs analog conversion processing on the image signal to convert the analog image signal into a signal having a predetermined television format. The video encoder 57 also performs signal processing on this signal to output it as signals of two formats such as a composite signal Sc and a separate signal Ss. The video encoder 57 adds a synchronizing signal to the image signal simultaneously. In this embodiment, the television format relates to NTSC format or PAL format. A first signal-synthesizing unit 58 then receives the analog image signals (the composite signal Sc and the separate signal Ss).

The accompanying information reproduction unit 59 receives the encoded accompanying information that has been decoded in the MPEG decoder 54 and reproduces the accompanying information. During a set horizontal period in a vertical blanking period of time, the accompanying information reproduction unit 59 supplies the first signal-synthesizing unit 58 with the accompanying information. The signal-synthesizing unit 58 receives the accompanying information supplied during the set horizontal period and inserts and adds this accompanying information to the image signal to transmit it to the second signal-synthesizing unit 56.

The second signal-synthesizing unit 56 synthesizes the analog audio signal to the composite signal Sc and supplies the synthesized signal to a first output terminal (an image and/or audio terminal) 65a. The second signal-synthesizing unit 56 also synthesizes the analog audio signal to the separate signal Ss and supplies the synthesized signal to a second output terminal (an S terminal) 65b. Accordingly, if the television signal received by the receiving apparatus 50 contains any accompanying information, the television signals (the composite signal and the separate signal) output from the output terminals 65a, 65b also contains the accompanying information.

The control portion 50C contains the CPU 70 that controls signal processing. A storage device 72 is connected to the internal bus of the CPU 70 through the memory controller 71. The storage device 72 contains a read only memory (ROM) that stores any processing program for performing MPEG decode processing on the informational signal received at the LAN interface portion 50A or decoding the accompanying information and a random access memory (RAM) for acting as a working area that temporarily stores the processed data. It is to be noted that in this embodiment, a portion around the MPEG decoder 50B and the CPU 70, which is shown by broken lines in FIG. 5, is packaged as one chip.

The processing portion 50D for a remote control signal contains a light-receiving unit 75 for the remote control signal and a sub-microcomputer 76 that receives the remote control signal. The remote control signal allows to be carried out any start processing for any line establishment to the sending apparatus 20, any control processing for the sending apparatus 20 itself, any control processing for the external video apparatus 27, and the like. The sub-microcomputer 76 thus transmits signals for such the processing to the CPU 70.

The sub-microcomputer 76 is connected to a display 78 through a display controller 77. The display 78 is provided with plural display lamps. In the receiving apparatus 50 shown in FIG. 5, a power display lamp, a display lamp (WIRED LAN) lighting when the wired LAN is established, and a display lamp (WIRELESS LAN) lighting when the wireless LAN is established are illustrated. Light-emitting diode (LED) is used as any display lamps.

The above-mentioned receiving apparatus 50 has no display (monitor screen) for displaying an image and storage device for storing the image so that the receiving apparatus 50 may have an excellent quality in downsizing and be handy to carry. Accordingly, the receiving apparatus 50 can be provided at a low price and be easily carried when a user goes out of doors.

(Processing in Receiving Apparatus)

The following will describe processing example of the information-receiving-and-transmitting system 10, 100 thus configured.

Figure 6:
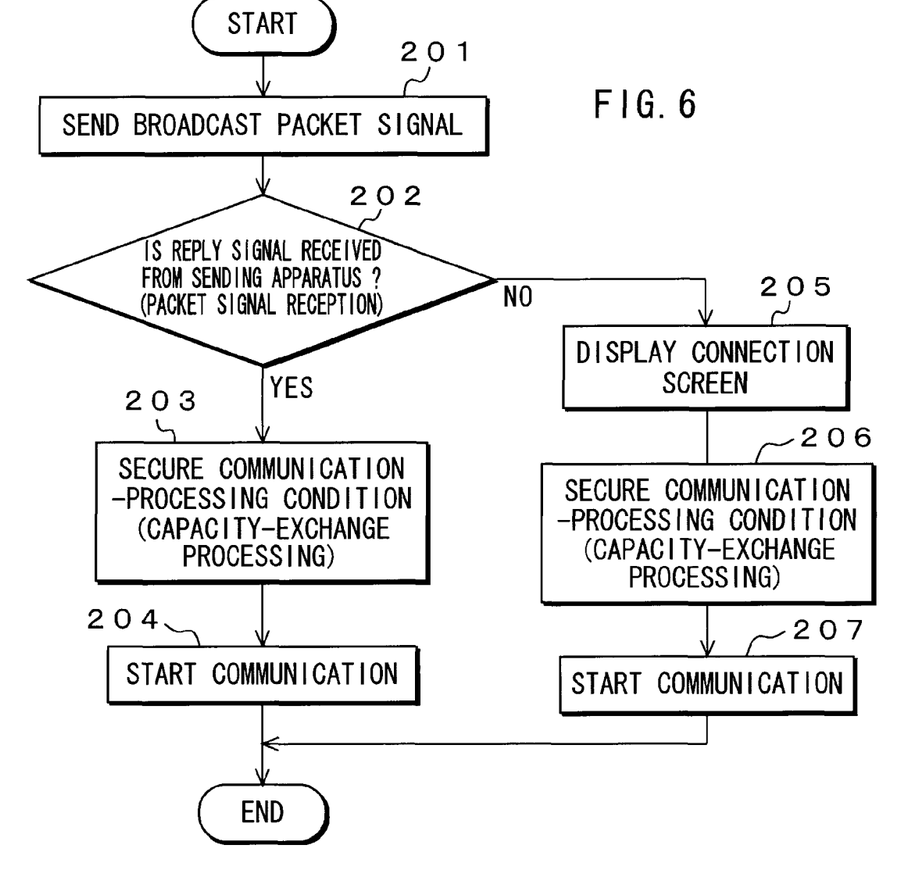
FIG. 6 is a flowchart for showing a communication method between the receiving apparatus and the sending apparatus.

FIG. 6 is a flowchart for showing an example of an initial setting process between each receiving apparatus 50 and each sending apparatus 20, which is carried out within the receiving apparatus 50.

The receiving apparatus 50 is used in the home area 120 and the on-the-road area 130, as shown in FIG. 3. If the receiving apparatus is used in the home area 120, the sending apparatus 20 is connected to an LAN in user's house while if it is used in the on-the-road area 130, the sending apparatus 20 is not connected to an LAN in the on-the-road area. Accordingly, depending on whether or not there is the sending apparatus 20, the receiving apparatus 50 can discriminate between the home area 120 and the on-the-road area 130. A communication rate and data-processing method in the home area 120 are different from those of the on-the-road area 130 so that any process such that any communication-processing conditions corresponding to the home area 120 or the on-the-road area 130 can be secured in its initial setting processing is performed.

Thus, each receiving apparatus 50 is provided with any devices, which secures such the communication conditions and can communicate with any subject apparatus (sending apparatus 20) that is connected to the network without taking into consideration a used place of the receiving apparatus 50, and any corresponding initial setting program.

Such the devices relates to a sending apparatus for sending a broadcast packet signal through a network to every apparatus that is connected in an identical network circuit, determining device for determining whether or not a reply signal in reply to the sent broadcast packet signal includes identification information (identifier) for identifying a local (specified) apparatus, and setting device that decides that the apparatus is connected to the identical network circuit if receiving the reply signal including the identification information to set a communication-processing condition for the identified apparatus. Further, the device is provided with an LAN interface portion that communicates with network-connected equipment.

The following will describe a processing example based on the initial setting program with reference to FIG. 6.

According to a flowchart shown in FIG. 6, if the receiving apparatus 50 is powered, this initial setting program starts to send a broadcast packet signal for certifying this sending apparatus 20 through a network to every apparatus, which is connected in an LAN (a network area), at step 201. This packet signal is an initial setting signal.

Every apparatus, which is connected in the LAN, receives this broadcast packet signal (initial setting signal). If the sending apparatus 20 receives this broadcast packet signal, the sending apparatus sends a reply signal back to the receiving apparatus 50 at step 202 with identification information (identifier such as code and/or flag) for identifying the sending apparatus 20 being inserted into any specified bit(s) included in this packet signal.

Every apparatus, which is connected in the LAN, sends a reply signal back to the receiving apparatus 50 in reply to the broadcast packet signal. The receiving apparatus 50 determines whether or not the sending apparatus 20 stays within an area where the receiving apparatus 50 stays by determining whether or not, in the reply signal, the packet signal including identification information (identifier) for indicating the sending apparatus 20 is received.

At the step 202, contents in the reply signal in reply to the broadcast packet signal are determined. If any identifier is inserted into the specified bit(s) of the reply signal, it is decided that the sending apparatus 20 is connected to the identical LAN. If it is decided at step 202 that the sending apparatus 20 is connected to the identical LAN, then a communication-processing condition for initial setting to the sending apparatus 20 is secured at step 203 as a communication-processing condition in the home area mode.

As the communication-processing condition in the home area mode, a protocol of OSI reference model is first set to a protocol in the home area mode (UDP/IP protocol). A communication rate thereof is second set. In a case of home area mode, it is set to a high bit rate (about 10 Mbps). A display image size of the receiving apparatus 50 is third set. This step 203 is also referred to as a capacity-exchange processing step, in order to set bit rate or the like.

After securing the communication-processing condition as the initial setting information, the receiving apparatus 50 communicates with the sending apparatus 20 at step 204. When the communication is established, the receiving apparatus 50 sends to the sending apparatus 20 various kinds of information indicating the secured (stored) communication-processing condition or the corresponding setting flag. The sending apparatus 20 carries out the signal processing following the MPEG standard based on the specified protocol according to the information indicating the communication-processing condition or the corresponding setting flag.

If it is determined that a reply signal including the identifier is not received at the step 202, then it is decided that the sending apparatus 20 is not connected to the identical LAN. In other words, it is decided that the receiving apparatus 50 stays within the on-the-road area 130 and an initial setting process therefor starts. Accordingly, at step 205, a setting screen is displayed on the corresponding television receiver 60 in order to control the sending apparatus 20 installed in the home area 120 from the on-the-road area 130.

Figure 7:
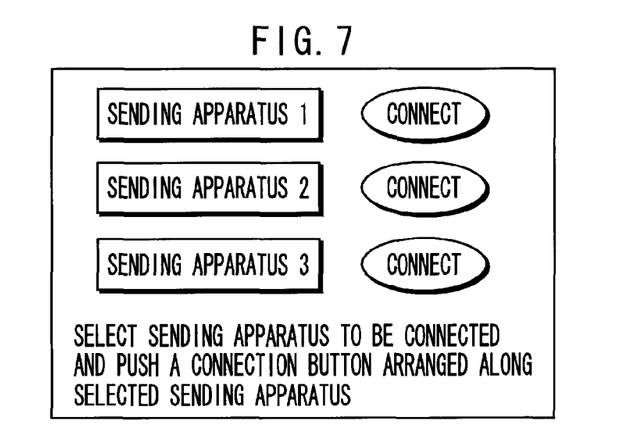
FIG. 7 is a diagram for illustrating an embodiment of a displayed television screen relative to an on-the-road area mode.

In this setting screen, with taking into consideration plural sending apparatuses 20, it is selected which sending apparatuses 20 the receiving apparatus 50 communicates with. For example, a setting screen shown in FIG. 7 is displayed, and a specified sending apparatus 20 is selected. After specifying the sending apparatus 20, the process goes to a standby state to connection process with the Internet by pushing a "connection" button shown and arranged along the specified sending apparatus 20.

Thereafter, at step 206, the communication-processing condition is secured. The receiving apparatus 50 is installed in the on-the-road area 130 so that the on-the-road area mode is set to secure the communication-processing condition for the on-the-road area mode. A protocol of OSI reference model is first set to a protocol (RTP/IP protocol) for the on-the-road area mode. A communication rate is second set to that of the Internet. A display image size of the receiving apparatus 50 is third set.

After securing the information indicating such the communication-processing condition, the standby state to connection process with the Internet 84 is released at step 207. This enables the receiving apparatus 50 to communicate with the sending apparatus 20 through the Internet 84 so that the sending apparatus 20 can change its signal processing based on this initial setting information.

Thus, when the receiving apparatus 50 is powered, it is automatically determined whether or not the sending apparatus 20 is connected with the LAN in the home area, so that the signal processing is automatically set confirming to a used area of the receiving apparatus 50. The above-mentioned communication-processing condition is illustrated and is not limited to the illustrated one on numbers of setting items.

(Determination Process of the Accompanying Information)

Figure 8:
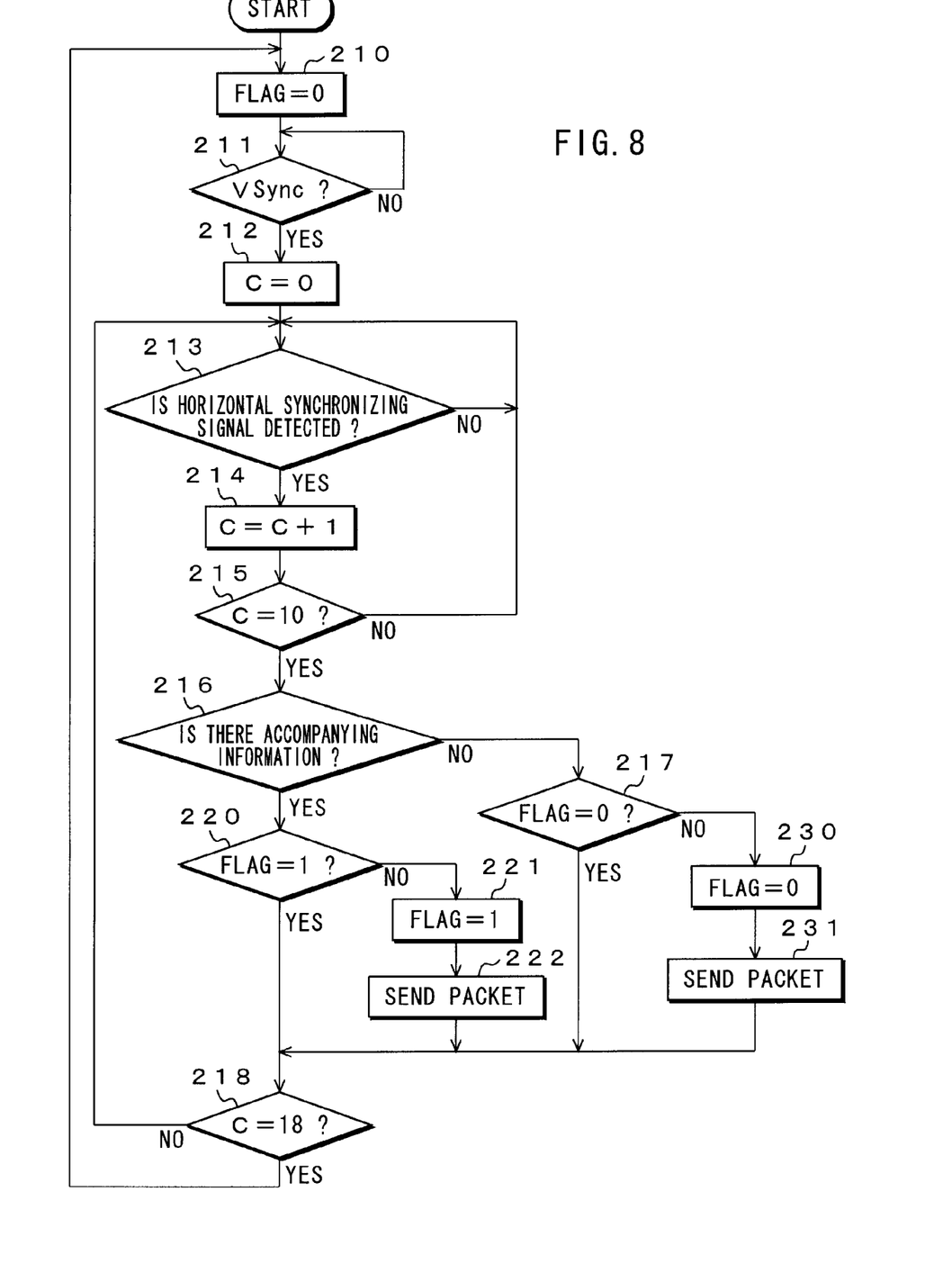
FIG. 8 is a flowchart for showing an example of determination processing on accompanying information.

FIG. 8 is a flowchart for showing an example of determination process on the accompanying information.

If a variable indicating whether or not there is accompanying information is expressed as "FLAG", the variable FLAG is reset to zero at step 210 in the flowchart shown in FIG. 8. At step 211, it is then determined whether or not a vertical synchronizing signal VSync is detected.

When a first vertical synchronizing signal VSync is detected, a count number C of a counter for a horizontal synchronizing signal is reset to zero (C=0) at step 212. When the reset is completed, the process goes to its standby state at step 213 until a horizontal synchronizing signal is detected. When the horizontal synchronizing signal is detected, the count number C is incremented by one at step 214. At step 215, such the count processing is continued until a number of the horizontal synchronizing signal reaches a predetermined number such as ten (C=10). This is because the accompanying information is inserted between a tenth horizontal synchronizing signal and seventeenth horizontal synchronizing signal in the vertical blanking period of time.

During a horizontal scanning period when the count number C reaches the predetermined number (for example, C=10), it is determined at step 216 whether or not there is accompanying information. If it is determined that there is no accompanying information during this tenth horizontal scanning period, then the variable FLAG remains its initial state (FLAG=0) at step 217 to continue determining whether or not there is accompanying information. In other words, the determination processing whether or not there is accompanying information is continued until the number of the horizontal synchronizing signal reaches 18 at steps 218 and 213 through 217.

If the number of the horizontal synchronizing signal reaches 18, the process goes back to step 210 and it is then determined whether or not a next vertical synchronizing signal is detected. It is to be noted that if the accompanying information is inserted into the image information, the same processing repeats until it is switched to a next image source when it is determined that there is no accompanying information because the accompanying information is generally inserted during a first vertical blanking period of time.

When next vertical blanking period is arrived and a vertical synchronizing signal is detected at the step 211, the process following the steps 212 is continued with the count number of the horizontal synchronizing signal being reset. If a number of the horizontal synchronizing signal reaches the predetermined number such as ten (C=10), the process goes to step 220 when it is determined at step 216 that there is accompanying information during the horizontal scanning period.

At the step 220, a state of the variable FLAG is determined. If the variable FLAG remains zero, the variable FLAG is set to one at step 221 and the process goes to accompanying-information-encoding processing to generate a packet at step 222. This accompanying-information-encoding processing relates to the accompanying-information-encoding processing shown in FIG. 4, for example, encoding processing of any code information indicating a species of the accompanying information, any code information corresponding to the accompanying information, and any code information (flag F=1) indicating a start of the accompanying information, respectively.

Thus, the signal-processing portion 50B such as the MPEG encoder packetizes the encoded accompanying information. In this moment, the count number C of the horizontal synchronizing signal indicates to less than 18 at the step 218 so that the process goes back to the step 213 where it is determined whether or not the horizontal synchronizing signal is detected. If a next horizontal synchronizing signal is detected and the accompanying information that is inserted during its horizontal scanning period is detected at steps 213 through 216, a state of the variable FLAG is determined at step 220. Since it is detected that the accompanying information is inserted during its last horizontal scanning period, the variable FLAG remains one. Accordingly, any accompanying-information-encoding processing is not performed on this newly detected accompanying information. The process goes from the step 220 through the step 218. Such the processing is continued until no insert of the accompanying information is detected.

Thus, detecting the accompanying information during the tenth horizontal scanning period enables the accompanying-information-encoding processing to be carried out but such the processing is not carried out thereafter. This is because it is not preferable relative to cutting of an amount of transmitted information to perform the same encoding processing on the same accompanying information.

If the count number C of the horizontal synchronizing signal exceeds 18, then it is determined at the step 216 that there is no accompanying information since the accompanying information is not inserted during the following horizontal scanning period and at the step 217, a state of the variable FLAG is determined. In this moment, the variable FLAG remains one, so that the variable FLAG is set to zero at step 230. At step 231, the accompanying-information-encoding processing is then performed. The accompanying-information-encoding processing in this case relates to encoding processing of any code information indicating a species of the accompanying information, any code information corresponding to the accompanying information, and any code information (flag F=0) indicating an end of the accompanying information, respectively.

Thus, when the accompanying information is detected, any encoding processing such as any code information corresponding to contents of the accompanying information, and any code information (flag F) indicating a start and an end of the accompanying information is performed. The receiving apparatus 50 decodes contents of the encoded accompanying information and if there is any accompanying information, the accompanying information is inserted by original numbered one in the image signal during a predetermined horizontal scanning period and then, output so that the original program signal into which the accompanying information is inserted can be restored. It is also possible to decrease an amount of the transmitted accompanying information considerably by transmitting the accompanying information with it being compressed.

According to the embodiments of the invention, in the information-receiving-and-transmitting systems 10, 100, a user can view and listen to any broadcast program of a channel tuned by the tuner 24 built in the sending apparatus 20 on a real-time basis by using the television receiver 60 installed in a place other than a place where the sending apparatus 20 is installed. The user can also view and listen to any program information reproduced by the external video apparatus 27 that is connected with the sending apparatus 20.

According to the embodiments of the invention, it is possible to control the sending apparatus 20 through the Internet 84 even at the on-the-road area such as a user's new place of appointment, so that the user can enjoy any program sent from his or her home by utilizing the television receiver 60 in the on-the-road area 130 as an image display device.

The television receiver 60 generally has a large size of screen, thereby enabling a viewer to view and enjoy an impact image. According to the embodiments of the invention, it is possible for the user to access the sending apparatus 20 installed in the LAN of his or her home easily to establish any communication therewith irrespective of a case where the receiving apparatus 50 is connected with the LAN of his or her home and a case where the receiving apparatus 50 is connected with the LAN of the on-the-road area. This allows the user to utilize the information-receiving-and-transmitting systems 10, 100 suitably irrespective of used places of the receiving apparatus 50.

If the program information contains the accompanying information such as copy control information to control the program information, it is possible to compress and transmit the program information including the accompanying information at any data format having less error. This enables the accompanying information to be correctly reproduced and to be transmitted to the receiving apparatus 50 without increasing an amount of transmitted information particularly. The receiving apparatus 50 can reconstitute it to an original program signal to which the accompanying information is added.

The present invention is applicable to the information-receiving-and-transmitting system under which a user can view image information and listen to audio information from an external video apparatus or the like connected with the LAN of the user's home or the Internet.

It should be understood by those skilled in the art that various modifications, combinations, sub-combinations and alternations may occur depending on design requirements and other factors insofar as they are within the scope of the appended claims or the equivalents thereof.

What is claimed is:

1. A communication-processing method that performs communication processing on network-connected equipment, the method comprising:
   sending an identification signal to every apparatus connected to a local area network (LAN) to identify a local apparatus;
   determining whether a reply signal including identification information in reply to the sent identification signal is received or not;
   deciding that the local apparatus is connected to the LAN if receiving the reply signal including the identification information;
   deciding that the local apparatus is not connected to the LAN if receiving no reply signal including the identification information;
   selecting a communication-processing condition for the identified local apparatus based on the deciding whether the local apparatus is connected to the LAN, wherein the selecting a communication-processing condition includes selecting User Datagram Protocol (UDP) and a first bit rate for communication with the identified local apparatus when it is decided that the identified local apparatus is connected to the LAN and selecting Real-time Transport Protocol (RTP) and a second bit rate, which is less than the first bit rate for communication with the identified local apparatus when it is decided that the identified local apparatus is not connected to the LAN;
   communicating with the identified local apparatus via the LAN using UDP and the first bit rate when it is decided that the local apparatus is connected to the LAN, and communicating with the local apparatus after connection to the Internet using RTP and the second bit rate when it is decided that the local apparatus is not connected to the LAN; and
   receiving video content from the local apparatus, the video content including accompanying information for controlling the reproduction of the video content, wherein the accompanying information includes copy guard information and information relative to a wide-detection signal for switching a display image size.

2. The communication-processing method according to claim 1, wherein the identification signal includes a broadcast packet signal.

3. The communication-processing method according to claim 1, further comprising:
   sending program information through the LAN.

4. The communication-processing method according to claim 3, wherein the LAN includes at least any one of a wired local area network and a wireless local area network.

5. The communication-processing method according to claim 1, wherein the accompanying information is inserted in a horizontal scanning period of the video content between a first horizontal scanning period and a second horizontal scanning period.

6. The communication-processing method according to claim 5, further comprising:
   counting a number of horizontal synchronization signals of the received video content;
   comparing the number of horizontal synchronization signals of the received video content to a predetermined threshold value; and
   determining whether the accompanying information exists within a current horizontal scanning period when the number of horizontal synchronization signals of the received video content to exceeds the predetermined threshold value.

7. A receiving apparatus comprising:
   a communication interface configured to send an identification signal to every apparatus connected to a Local Area Network (LAN) to identify a local apparatus; and
   a processor configured to determine whether a reply signal including identification information in reply to the sent identification signal is received or not, decide that the local apparatus is connected to the LAN if receiving the reply signal including the identification information and set a communication-processing condition for the identified local apparatus based on the deciding that the local apparatus is connected to the LAN, wherein the setting a communication-processing condition includes setting User Datagram Protocol (UDP) and a first bit rate for communication with the identified local apparatus when it is decided that the identified local apparatus is connected to the LAN, wherein the communication interface is configured to communicate with the identified local apparatus using UDP and the first bit rate when it is decided that the identified local apparatus is connected to the LAN, the processor is configured to decide that the local apparatus is not connected to the LAN if no reply signal is received including the identification information and set Real-time Transport Protocol (RTP) and a second bit rate, which is less than the first bit rate for communication with the identified local apparatus when it is decided that the identified local apparatus is not connected to the LAN, the communication interface is configured to communicate with the local apparatus after connection to the Internet if receiving no reply signal using RTP and the second bit rate when it is decided that the identified local apparatus is not connected to the LAN, and the communication interface is configured to receive video content from the local apparatus, the video content including accompanying information for controlling the reproduction of the video content, wherein the accompanying information includes copy guard information and information relative to a wide-detection signal for switching a display image size.

8. The receiving apparatus according to claim 7, wherein the identification signal includes a broadcast packet signal.

9. The receiving apparatus according to claim 7, wherein the communication interface includes at least any one of an interface for a wired network and an interface for a wireless network.

* * * * *